(No Model.)

J. R. HENRY.
BREAST STRAP.

No. 554,690.                              Patented Feb. 18, 1896.

Witnesses:
Geo. E. Frech
Helena Bauer

Inventor:
John R. Henry,
By Attorneys
Collamer & Co.

ANDREW B.GRAHAM. PHOTO-LITHO. WASHINGTON, D.C.

UNITED STATES PATENT OFFICE.

JOHN R. HENRY, OF HOMER CITY, ASSIGNOR OF ONE-HALF TO W. A. GUTHRIE, OF INDIANA, PENNSYLVANIA.

BREAST-STRAP.

SPECIFICATION forming part of Letters Patent No. 554,690, dated February 18, 1896.

Application filed May 21, 1895. Serial No. 550,040. (No model.)

*To all whom it may concern:*

Be it known that I, JOHN R. HENRY, a citizen of the United States, and a resident of Homer City, Indiana county, State of Pennsylvania, have invented certain new and useful Improvements in Breast-Straps; and my preferred manner of carrying out the invention is set forth in the following full, clear, and exact description, terminating with a claim particularly specifying the novelty.

This invention relates to harness, and more especially to that class thereof known as "breast-strap slides;" and the object of the same is to produce an improved device of this character. Heretofore an ox-yoke has been patented having depending from its body between the neck-pieces two arms of inverted-T shape pivoted at their upper ends to the yoke, having one extremity of their cross-heads pivotally connected together and having eyes in the outer extremities of their cross-heads, in which eyes were hung links supporting a large ring, through which the tongue or pole passed, this arrangement being obviously for the purpose of adjusting the height at which the front end of the tongue would be supported by the yoke.

My present invention consists of a somewhat analogous structure arranged beneath the collar of each animal and comprising a pair of links pivoted at their upper ends to a bar and pivotally connected at their lower ends with an inner or intermediate link, the latter supporting a snap-hook, which is connected with the tongue or pole, the object being to allow the entire set of pivoted links to swing laterally (as the device described above would not do) to accommodate itself to the movements of the pole. The exact construction of parts is further described below and illustrated in the accompanying drawings, in which—

Figure 1:
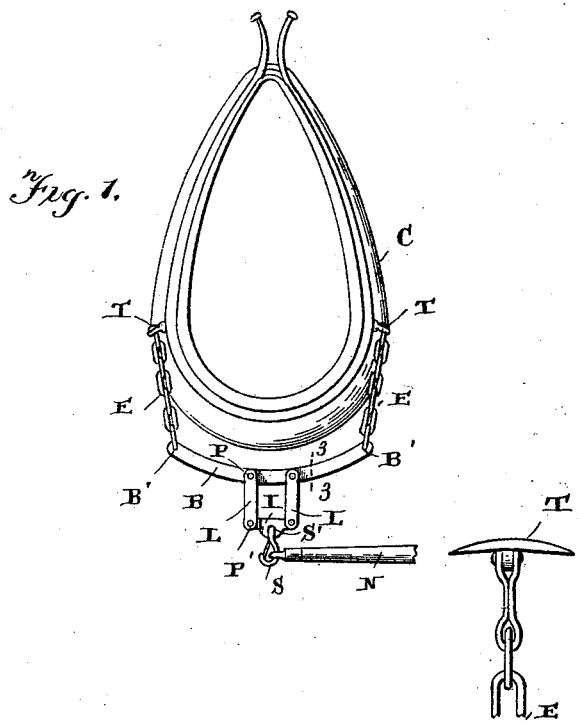
Figure 3:
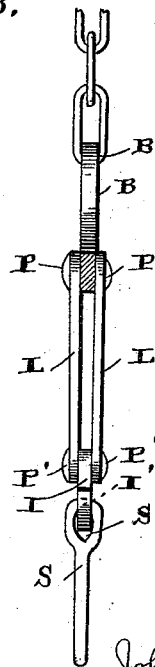
Figure 2:
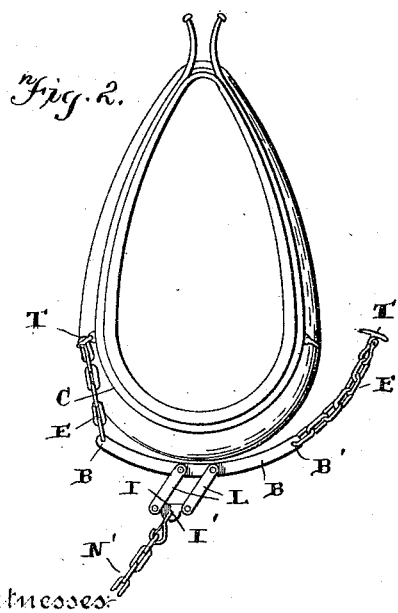

Figure 1 is a front elevation showing the parts in one position and the snap-hook as connected with one end of a cross-bar which supports the pole. Fig. 2 is a similar view showing the bar as drawn up closer to the collar, one end chain free to show its fastener, the links as swung to an oblique position, and the snap-hook as connected with a chain that leads to the pole. Fig. 3 is a transverse sectional view on the line 3 3 of Fig. 1.

In the said drawings, the letter C designates a collar such as is usually applied to a horse's neck, and the same may carry the hames.

B is a downwardly-curved bar of iron or steel about a foot long, having eyes B' at its extremities.

E are short pieces of chain standing at the ends of this bar and linked into said eyes, and T may be snap-hooks or T-shaped fasteners attached to the outer ends of said chains and adapted to be adjustably connected with the sides of the collar or with the hames, their connection therewith being preferably made at such point as to draw the bar B close up under the collar C, and preventing its swinging laterally, as seen in Fig. 2; or it may be made so as to leave it hanging a slight distance below said collar, as seen in Fig. 1.

The letters L designate four links of steel or iron pivotally connected at their upper ends by bolts or rivets P with the bar B near its center and arranged in pairs, which stand always parallel and normally upright, and I is an intermediate or inner link standing always horizontal between the lower ends of the links L and pivotally connected thereto by their bolts or rivets P, the construction being such that the entire frame thus formed can swing laterally on its pivots, as seen in Fig. 2, and the inner link I will always stand in a horizontal position. Said inner link has an eye I', with which is engaged an eye S' at the upper end of a snap-hook S that I preferably employ, although it will be understood that this snap-hook might be dispensed with and the cross-bar or chain described below connected permanently with said eye I' by any suitable means.

In Fig. 1 the letter N designates a cross-bar such as is usually connected at its center with the tongue or pole, and the snap-hook S engages an eye at the extremity of this bar, while in Fig. 2 the letter N' designates one of two chains which is connected with the pole and leads obliquely upward and outward to the snap-hook S.

We will refer herein by the word "cross-bar" to either the part lettered N or that lettered N', as they are substantial equivalents.

In the use of this device the bar B is fastened in place by engaging the snap-hooks or other fastening devices T with the sides of the collar or the hames at proper points to hold the bar B in the desired position, and if the chain N' be employed a further adjustment of the height of the pole can be effected by engaging the proper link thereof with the snap-hook S. There is, of course, one of these devices beneath the neck of each animal of a team, and each supports its end of the cross-bar N, whose center in turn supports the front end of the pole. It is well known that a tongue or pole which is rigidly connected with the front axle (especially where the road is rough) has a considerable vibratory motion at its front end, and such motion this improved device will permit with the least possible strain on the two collars, if loose, as in Fig. 1, and with the least longitudinal movement of the pole if drawn up tightly under the collar, as in Fig. 2. I have shown in the latter figure how the links swing inward on their four pivots as the pole moves away from them, and even if the movement should be sufficient to slide the bar B beneath the collar C there will be comparatively little extra strain on the latter, and hence on the neck of the animal.

All parts are of the desired sizes, shapes, proportions, and materials consistent with this description, and considerable change in the specific details may be made without departing from the spirit of my invention.

What I claim as new is—

The combination with a horse-collar, and the hames having eyes; of a downwardly-curved bar B standing beneath the collar, chains E at its ends having fastening devices T at their extremities for adjustable connection with said eyes, two parallel pairs of links L pivoted to the bar and pendent therefrom, a single intermediate horizontal link I pivoted at its ends between the lower extremities of the pendent links and having a central eye I', a snap-hook S pendent from this eye, and a cross-bar detachably connected with said snap-hook, as and for the purpose set forth.

In testimony whereof I have hereunto subscribed my signature on this the 21st day of March, A. D. 1895.

JOHN R. HENRY.

Witnesses:
W. A. GUTHRIE,
ROBERT PHILIPS.